US008100714B2

(12) United States Patent
Zhou

(10) Patent No.: US 8,100,714 B2
(45) Date of Patent: Jan. 24, 2012

(54) CONNECTOR AND ELECTRONIC DEVICE USING SAME

(75) Inventor: Ri Zhou, Shenzhen (CN)

(73) Assignees: Shenzhen Futaihong Precision Industry Co., Ltd., ShenZhen, Guangdong Province (CN); Chi Mei Communication Systems, Inc., Tu-Cheng, New Taipei (TW)

( * ) Notice: Subject to any disclaimer, the term of this patent is extended or adjusted under 35 U.S.C. 154(b) by 0 days.

(21) Appl. No.: 12/859,306

(22) Filed: Aug. 19, 2010

(65) Prior Publication Data

US 2011/0237092 A1 Sep. 29, 2011

(30) Foreign Application Priority Data

Mar. 25, 2010 (CN) .......................... 2010 1 0132930

(51) Int. Cl.
*H02R 13/62* (2006.01)

(52) U.S. Cl. ....................................... 439/557; 439/701

(58) Field of Classification Search .................. 439/557, 439/701
See application file for complete search history.

(56) References Cited

U.S. PATENT DOCUMENTS

| | | | | |
|---|---|---|---|---|
| 5,074,801 | A * | 12/1991 | Siemon | 439/188 |
| 5,178,554 | A * | 1/1993 | Siemon et al. | 439/188 |
| 5,199,896 | A * | 4/1993 | Mosquera | 439/329 |
| 5,697,812 | A * | 12/1997 | Sampson et al. | 439/567 |
| 6,315,606 | B1 * | 11/2001 | Hwang | 439/557 |
| 6,547,591 | B2 * | 4/2003 | Okabe et al. | 439/557 |
| 6,659,796 | B1 * | 12/2003 | Waddell et al. | 439/557 |
| 7,059,915 | B1 * | 6/2006 | Schempp et al. | 439/676 |
| 7,144,268 | B2 * | 12/2006 | Koenig et al. | 439/353 |

* cited by examiner

*Primary Examiner* — Gary F. Paumen
(74) *Attorney, Agent, or Firm* — Altis Law Group, Inc.

(57) ABSTRACT

A connector is latched to a circuit board, the connector comprises a main body. The main body comprises two opposite ends, each end of the main body having a securing protrusion protruding therefrom, the securing protrusion for latching the connector to the circuit board.

1 Claim, 5 Drawing Sheets

CONNECTOR AND ELECTRONIC DEVICE USING SAME

BACKGROUND

1. Technical Field

This exemplary disclosure generally relates to connectors, and particularly to connectors used in electronic devices.

2. Description of Related Art

Commonly, portable electronic devices such as mobile phones use connectors that are mounted to printed circuit boards by surface mounted technology. However, the surface mounting technology can be complicated, and can not easily allow detachment of the connectors from printed circuit boards after connectors are mounted to printed circuit boards.

Therefore, there is room for improvement within the art

BRIEF DESCRIPTION OF THE DRAWINGS

Many aspects of the exemplary connector and electronic device using the connector can be better understood with reference to the following drawings. The components in the various drawings are not necessarily drawn to scale, the emphasis instead being placed upon clearly illustrating the principles of the exemplary connector and electronic device using the connector. Moreover, in the drawings, like reference numerals designate corresponding parts throughout the diagrams.

DETAILED DESCRIPTION

Figure 1:
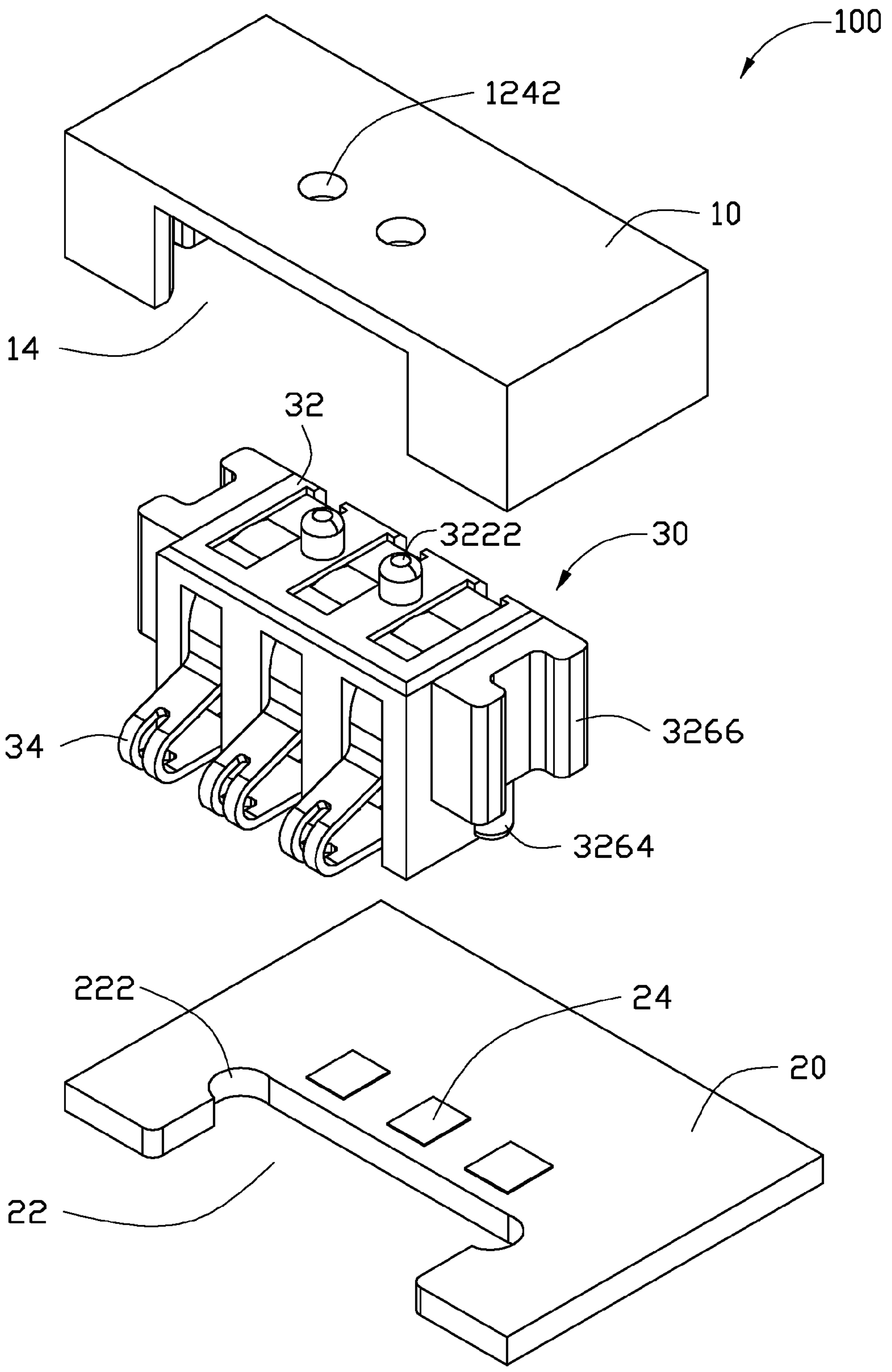
FIG. 1 is an exploded view of an electronic device with an exemplary connector.
Figure 3:
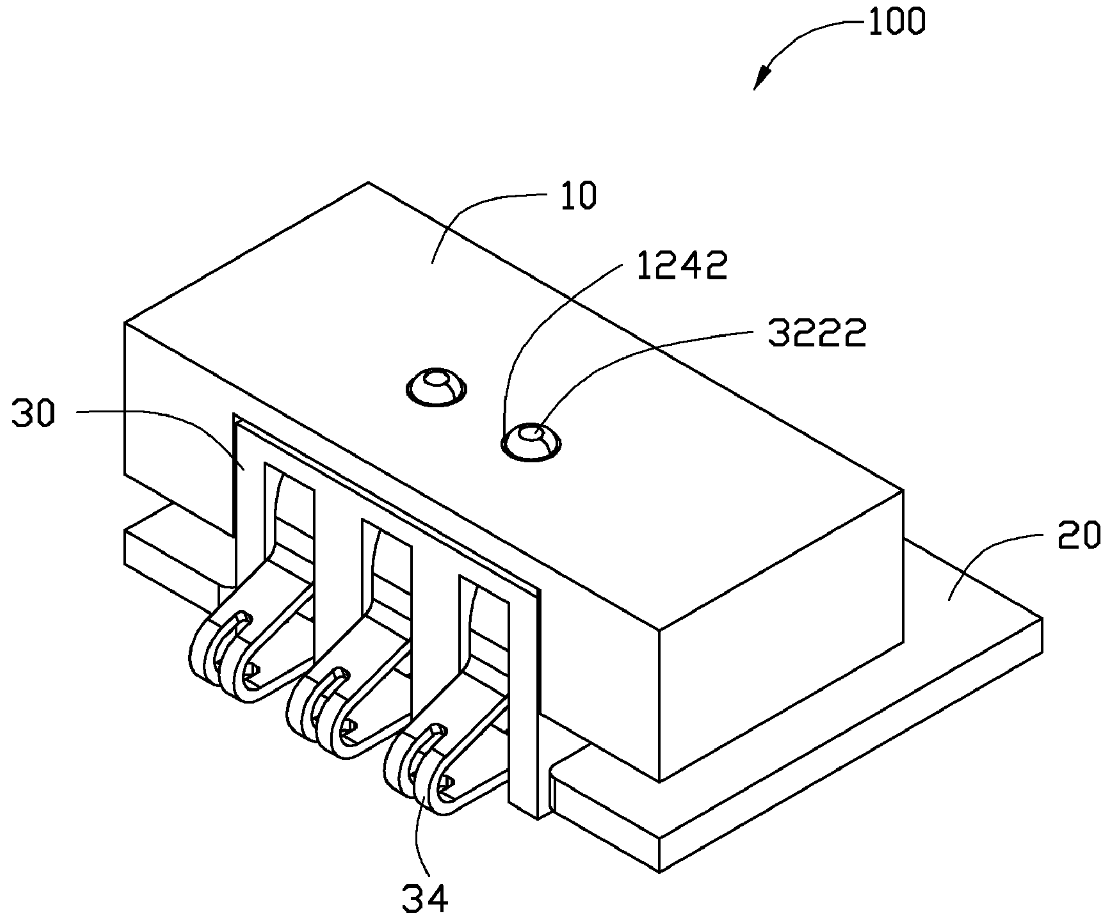
FIG. 3 is an assembled view of the electronic device shown in FIG. 1.
Figure 4:
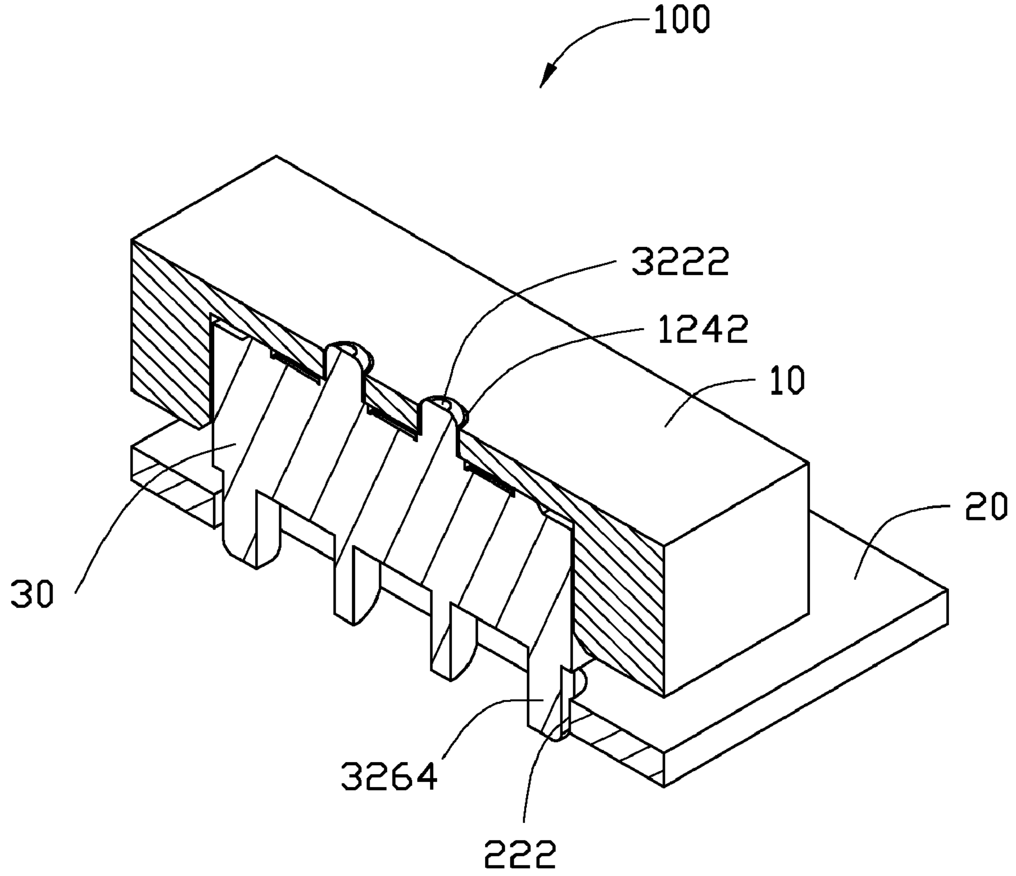
FIG. 4 is a cross-sectional view of the electronic device shown in FIG. 3.
Figure 5:
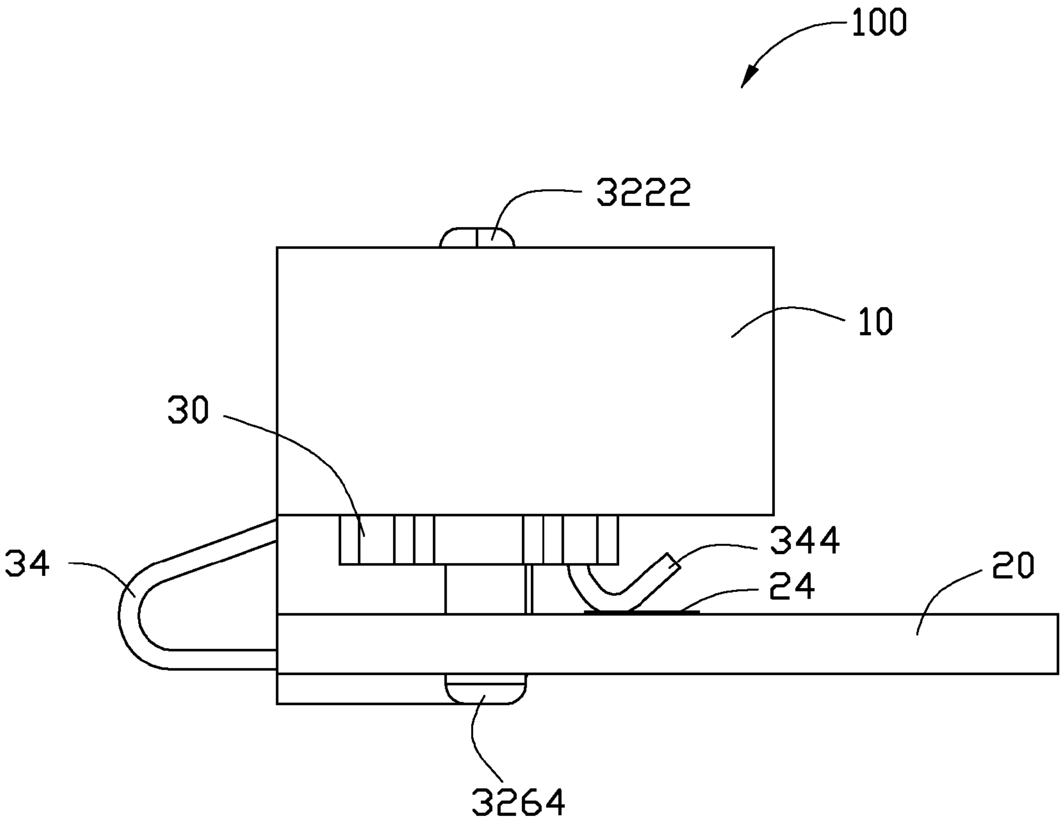
FIG. 5 is a side view of the electronic device shown in FIG. 3.

Referring to FIGS. 1 and 3, an electronic device 100 includes a housing 10, a circuit board 20 and a connector 30 mounted between the housing 10 and the circuit board 20. The connector 30 is used for electrically connecting the circuit board 20 to an electronic element (not shown) of the electronic device, such as a battery.

Figure 2:
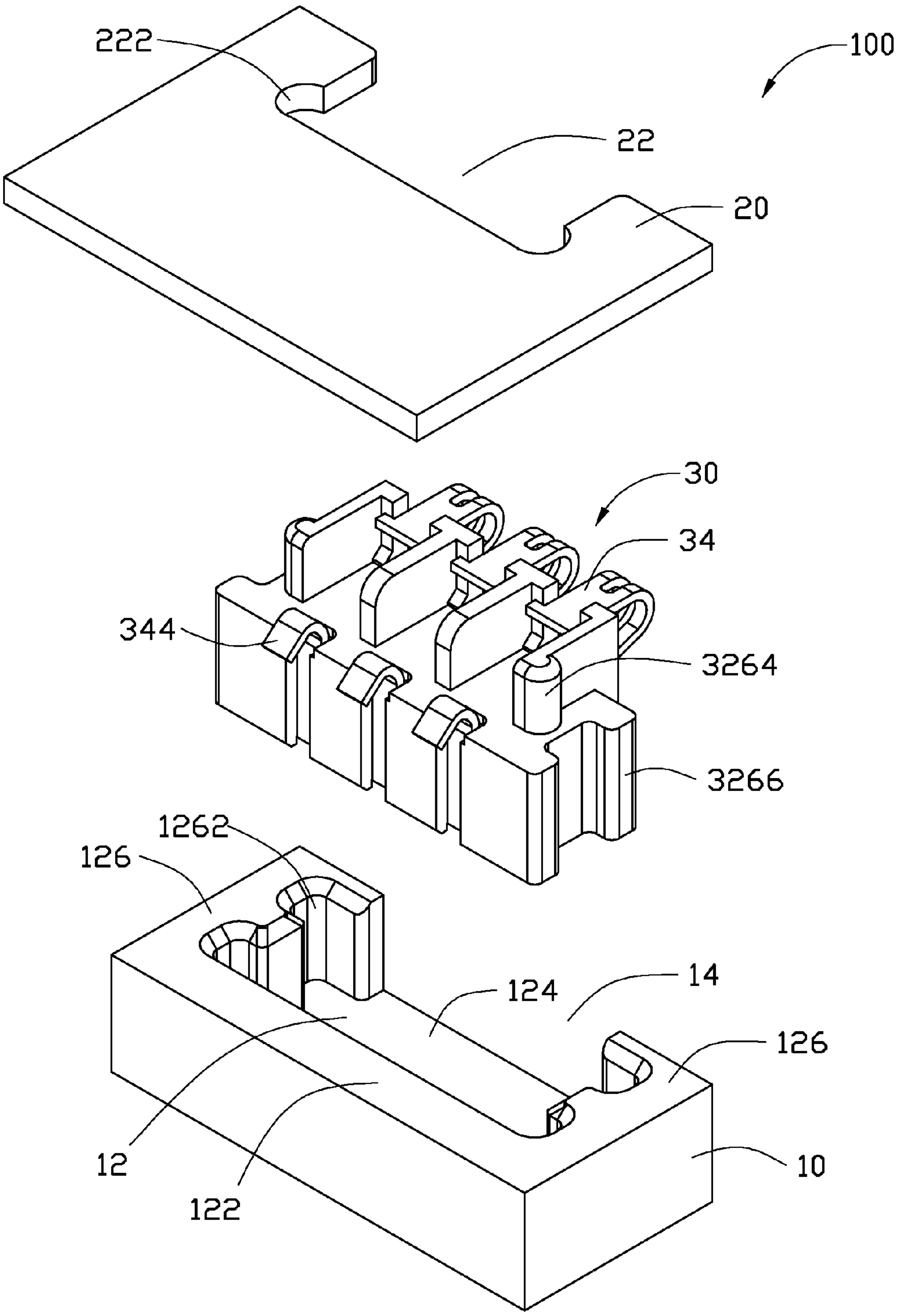
FIG. 2 is similar to FIG. 1, but showing the electronic device in another aspect.

Referring to FIGS. 1 and 2, the housing 10 defines a receptacle 12 for accommodating the connector 30 and a notch 14 communicating with the receptacle 12. The receptacle 12 is enclosed by a sidewall 122, a base wall 124 and two opposite end walls 126. The housing 10 further defines two spaced positioning holes 1242 defined in the base wall 124. The positioning holes 1242 are for precisely aligning the connector 30 within the receptacle 12. Each end wall 126 defines two spaced latching slots 1262 for latching the connector 30 in the receptacle 12.

Referring to FIG. 1, the circuit board 20 defines an opening 22 for accommodating the connector 30 and two opposite securing slots 222 respectively located away from the entrance of the opening 22 and communicating with the opening 22. The securing slots 222 are for securing the connector 30 in the opening 22. The circuit board 20 further includes a plurality of contacts 24 for electrically connecting the circuit board 20 to the connector 30.

Referring to FIGS. 1 and 2, the connector 30 includes a main body 32 and a plurality of flexible contacts 34 mounted on the main body 32 for electrically connecting to electrical elements of the electronic device 100. The connector 30 further includes two positioning posts 3222 protruding from one surface of the main body 32 facing to the housing 10, and the positioning posts 3222 extend into the positioning holes 1242 (in FIG. 3) so the connector 30 can aligned relative to the receptacle 12. Each end of the connector 30 further protrudes two latching blocks 3266, and each latching block 3266 latches in one of the latching slots 1262 to latch the connector 30 in the receptacle 12. The connector 30 further includes two securing protrusions 3264 protruding from another surface thereof facing the circuit board 20, and each securing protrusion 3264 secures with one of the securing slots 222 to secure the connector 30 in the opening 22. And when the connector 30 locates in the opening 22, the contacts 34 extend out of the opening 22. The connector 30 may include a plurality of elastic plates 344 protruding therefrom for electrically connecting the connector 30 to the contacts 24.

Referring to FIGS. 1-5, in assembly, the connector 30 is aligned with the receptacle 12 with the positioning posts 3222 aligned with the positioning holes 1242 and the latching blocks 3266 aligned with the latching slots 1262. Then, the connector 30 is pushed toward the housing 10 until the positioning posts 3222 extend into the positioning holes 1242 and the latching blocks 3266 latch with the latching slots 1262. Thus, the connector 30 is firmly mounted in the receptacle 12. The securing protrusions 3264 are aligned with the securing slots 222, and the connector 30 is then pushed toward the circuit board 20 until the securing protrusions 3264 are tightly latched in the latching slots 1262, to finish assembly of the electronic device 100. At this time, each elastic plate 344 resists one of the contacts 24.

As said above, the connector 30 can be secured to the circuit board 20 only by latching the securing protrusions 3264 in the securing slots 222. And the connector 30 can be secured to the housing 10 only by latching the latching blocks 3266 in the latching slots 1262. Thus, the connector 30 can easily mount to the circuit board 20 and the housing 10. Additionally, to detach the connector 30 from the circuit board 20, the connector 30 is merely pulled away from the circuit board 20 until the securing protrusions 3264 slide out of the securing slots 222, so the connector 30 is detached from the circuit board 20. Furthermore, to detach the connector 30 from the housing 10, the connector 30 is pulled away from the housing 10 until the latching protrusions slide out of the latching slots 1262, so the connector 30 is detached from the housing 10.

It is to be further understood that even though numerous characteristics and advantages of the exemplary embodiments have been set forth in the foregoing description, together with details of structures and functions of various embodiments, the disclosure is illustrative only, and changes may be made in detail, especially in matters of shape, size, and arrangement of parts within the principles of the exemplary invention to the full extent indicated by the broad general meaning of the terms in which the appended claims are expressed.

What is claimed is:

1. An electronic device, comprising:

a housing defining a receptacle enclosed by two opposite end walls and a base wall, each end wall defining at least one latching slot communicating with the receptacle; and a connector including a main body, the main body comprising two opposite ends, each end of the main body having at least one latching block protruding therefrom, each latching block latching in one latching slot to latch the connector to the housing;

wherein the housing further defines two spaced positioning holes defined in base wall; the connector further includes two positioning posts protruding from one surface thereof facing to the housing, and the positioning posts extend into the positioning holes so the connector can precisely accommodates in the receptacle.

* * * * *